US012656618B2

(12) United States Patent
Marte

(10) Patent No.: US 12,656,618 B2
(45) Date of Patent: Jun. 16, 2026

(54) HEAD-MOUNTED DISPLAY DEVICE, SCIENTIFIC OR SURGICAL IMAGING SYSTEM AND METHOD

(71) Applicant: Leica Instruments (Singapore) Pte Ltd., Singapore (SG)

(72) Inventor: Christian Marte, Singapore (SG)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 62 days.

(21) Appl. No.: 18/743,149

(22) Filed: Jun. 14, 2024

(65) Prior Publication Data

US 2024/0419005 A1 Dec. 19, 2024

(30) Foreign Application Priority Data

Jun. 16, 2023 (DE) .......................... 102023115877.5

(51) Int. Cl.
*H04N 23/00* (2023.01)
*G02B 27/01* (2006.01)
(Continued)

(52) U.S. Cl.
CPC ......... *G02B 27/0176* (2013.01); *G06F 1/163* (2013.01); *H04N 13/344* (2018.05);
(Continued)

(58) Field of Classification Search
CPC ........ G02B 27/0176; G02B 2027/0161; G02B 7/001; G02B 7/002; G02B 2027/0181;
(Continued)

(56) References Cited

U.S. PATENT DOCUMENTS 8,923,703 B2 12/2014 Masarik et al.
10,571,691 B1 2/2020 Yee et al.
(Continued)

FOREIGN PATENT DOCUMENTS

DE 202022100374 U1 3/2022
GB 2569562 A 6/2019

*Primary Examiner* — Frank F Huang
(74) *Attorney, Agent, or Firm* — 2SPL Patent Attorneys PartG mbB; Yong Beom Hwang

(57) ABSTRACT

Examples relate to a head-mounted display device, a method for providing a head-mounted display device and a scientific or surgical imaging system comprising a head-mounted display device. The head-mounted display device comprises a display assembly, comprising one or more displays for displaying the image. The head-mounted display device comprises a video processing assembly, comprising processing circuitry for generating at least one processed display signal for the one or more displays based on an input display signal. The head-mounted display device comprises a main mounting structure for fastening the display assembly and the video processing assembly to the head of a user. At least one of a weight of the display assembly and the video processing assembly and a positioning of the display assembly and the video processing assembly at the main mounting structure is such, that a weight distribution between front and back of the head-mounted display device is balanced.

13 Claims, 6 Drawing Sheets

(51) Int. Cl.
    *G06F 1/16*         (2006.01)
    *H04N 13/344*     (2018.01)
    *H04N 23/80*      (2023.01)

(52) U.S. Cl.
    CPC ..... *H04N 23/80* (2023.01); *G02B 2027/0161*
           (2013.01); *H04N 2213/001* (2013.01)

(58) Field of Classification Search
    CPC ...... G06F 1/163; H04N 13/344; H04N 23/80;
                      H04N 2213/001
    See application file for complete search history.

(56)                 References Cited

U.S. PATENT DOCUMENTS

| | | |
|---|---|---|
| 10,712,791 B1 | 7/2020 | Stanley et al. |
| 11,223,889 B2 * | 1/2022 | Provost .................... H04R 1/04 |
| 11,892,644 B2 * | 2/2024 | Osterhout .............. G06F 1/206 |
| 12,013,723 B2 * | 6/2024 | Kuronuma ......... G02B 27/0176 |
| 12,368,267 B2 * | 7/2025 | Hossain .............. H01R 13/635 |
| 12,399,372 B1 * | 8/2025 | Masse ................ G02B 27/0176 |
| 2012/0162549 A1 * | 6/2012 | Gao ....................... G02B 6/003 |
| | | 359/651 |
| 2017/0151034 A1 | 6/2017 | Oda et al. |
| 2017/0227793 A1 * | 8/2017 | Abreu ................... H04R 1/028 |
| 2017/0364144 A1 | 12/2017 | Petrov |
| 2019/0361244 A1 | 11/2019 | Carollo et al. |
| 2020/0195844 A1 * | 6/2020 | Kim .................... H04N 13/167 |
| 2020/0225492 A1 | 7/2020 | Williams et al. |
| 2023/0168716 A1 | 6/2023 | Ahn et al. |

* cited by examiner

HEAD-MOUNTED DISPLAY DEVICE, SCIENTIFIC OR SURGICAL IMAGING SYSTEM AND METHOD

TECHNICAL FIELD

Examples relate to a head-mounted display device, to a method for providing a head-mounted display device and to a scientific or surgical imaging system comprising a head-mounted display device.

BACKGROUND

Microsurgery often demands a distortion-free magnified stereoscopic view of the operating field. Digital stereo microscopes can provide such views of the operating field. The image can be viewed through eye pieces at the microscope or may be displayed on an external screen or by head-mounted displays. As surgical procedures often take multiple hours, care may be taken to take into account the ergonomics of the display device being used. However, many head-mounted displays exercise a strain on their respective users, leading to headaches, neck pain or other forms of discomfort. Such strain may also be experienced by users of virtual reality goggles, augmented reality head-mounted devices and the like.

There may be a desire for providing an improved concept for a head-mounted display device, for example for a head-mounted display device for use with a surgical or scientific imaging device.

SUMMARY

This desire is addressed by the subject-matter of the independent claims.

Various examples of the independent claims are based on the finding, that many head-mounted display devices do not take into account the balance between the front of the head-mounted display device, which usually contains the digital display(s), and the back of the head-mounted display device, which often only contains a mechanism for mechanically adjusting a headband of the head-mounted display device. In many cases, head-mounted display devices have a suboptimal weight distribution between the front and the back. In various examples of the proposed concept, an improved balance is provided between the front and the back of the head-mounted display device, by splitting the functionality of the head-mounted display device into a display assembly that is arranged at the front and a video processing assembly that is arranged at the back, and that is used to generate a processed display signal being used to drive the display(s) of the display assembly. Both the display assembly and the video processing assembly are held by a main mounting structure, and the weight and/or positioning of the display assembly and of the main mounting structure are such, that a balance is obtained between the back and front of the head mounted display device. In other words, a balanced headset is provided. This way, a head-mounted display device is provided that may avoid discomforts, such as headache or neck pain, when it is worn by a user, such as a surgeon during surgery. This makes the head-mounted display device particularly suitable for use during surgical procedures, such as microsurgical procedures or ophthalmological procedures.

Some aspects of the present disclosure relate to a head-mounted display device for displaying an image. The head-mounted display device comprises a display assembly with one or more displays for displaying the image. The head-mounted display device comprises a video processing assembly with processing circuitry for generating at least one processed display signal for the one or more displays based on an input display signal. The head-mounted display device comprises a main mounting structure for fastening the display assembly and the video processing assembly to the head of a user. At least one of a weight of the display assembly and the video processing assembly and a positioning of the display assembly and the video processing assembly at the main mounting structure is (chosen, selected) such, that a weight distribution between front and back of the head-mounted display device is balanced. This way, a head-mounted display device is provided that may avoid discomforts, such as headache or neck pain, when it is worn by a user, such as a surgeon during surgery.

For example, at least one of the weight of the display assembly and the video processing assembly and the positioning of the display assembly and the video processing assembly at the main mounting structure may be such, that a center of gravity of the head-mounted display device may be at (or orthogonally offset from) a center section of an imaginary line between the display assembly and video processing assembly. By placing the center of gravity at this point, the center of gravity may be placed above the spine of the user wearing the head-mounted display device, which may help avoiding the aforementioned discomfort.

In various examples, the imaginary line extends from a center of gravity of the display assembly to a center of gravity of the video processing assembly. For example, the imaginary line may extend, if a single display is used, from a center point of the display or, if two displays are used, from a center point between the two displays, to a center point of the processing circuitry. The displays and processing circuitry are usually at or near the center of gravity of the respective assembly and may therefore serve as points of reference for balancing the head-mounted display device.

According to an example, at least one of the weight of the display assembly and the video processing assembly and the positioning of the display assembly and the video processing assembly at the main mounting structure may be selected such, that a weight distribution between front and back of the head-mounted display device is substantially equal (e.g., substantially symmetrical between the front and back). This way, a head-mounted display device is provided that may avoid discomforts, such as headache or neck pain, when it is worn by a user, such as a surgeon during surgery, as the head of the user is neither pulled to the front nor to the back.

For example, a weight of the video processing assembly may be at most 50% larger than a weight of the display assembly. By choosing the weight selection such that the display assembly is lighter or as light as the video processing assembly, the comfort may be increased during surgery, as the surgeon's head is usually tilted slightly downward during surgery.

In various examples, the main mounting structure may comprise a first headband and a second headband, the first headband being arranged to cross the head of the user of the head-mounted display device and the second headband being arranged to extend around the head of the user. According to an example, a center of gravity may be orthogonally offset from a center section of the imaginary line towards the first headband. Thus, a substantial portion of the weight of the head-mounted display may be carried by the first headband, above the spine of the user, which may help avoiding the aforementioned discomfort.

According to an example, the video processing assembly may comprise at least one interface for providing the at least one processed display signal to the one or more displays of the display assembly via at least one cable being mounted to the main mounting structure and for receiving the input display signal via an input cable. This cable between the video processing assembly and the display assembly may support the separation of the video processing circuitry from the display assembly, which leads to the improved balance of the head-mounted display device.

For example, the video processing circuitry may be configured to split the input display signal into two processed display signals for two displays of the display assembly. Additionally, or alternatively, the video processing circuitry may be configured to adjust at least one of a brightness, a x/y shift and a white balance in the at least one processed display signal Additionally, or alternatively, the video processing circuitry may be configured to generate the at least one processed display according to at least one calibration parameter. Thus, the video processing assembly may serve to perform (any) video processing being performed by the head-mounted display device. These types of video processing may make the head-mounted display device less dependent on the source of the input display signal, such that the same input display signal may be provided to different head-mounted display devices and then tailored to the individual user or head-mounted display device by the processing circuitry of the respective head-mounted display device.

As outlined above, the video processing assembly includes the processing circuitry being used to generate the processed display signal(s) for the one or more displays. This processing circuitry may be housed on a printed circuit board (PCB), which may further include the interfaces for the cable to the display assembly and the input cable. To protect the PCB with the processing circuitry and interfaces, the PCB may be protected by a housing. In other words, the video processing assembly may comprise a housing and a printed circuit board with the processing circuitry.

In some examples, the housing and the printed circuit board may comprise holes for passing through a shaft of a size adjustment mechanism for adjusting a circumference of the main mounting structure. By passing the shaft through the housing and the PCB, a more compact construction of the video processing assembly is enabled, with a center of gravity that is easier to balance with the display assembly.

Some components of the head-mounted display device may serve multiple functionalities. For example, the back wall (e.g., back cover) of the housing may be used both as a counterweight for the, usually heavy, display assembly, and as a heatsink for handling the heat of the processing circuitry. For example, at least one wall of the housing may comprise a metal and act as a heatsink for the processing circuitry. This at least one wall may be arranged such that it faces away from the head-mounted display device, such that the heat is kept away from the user/surgeon. Additionally, the at least one wall comprising metal may act as a counterweight for the display assembly, helping to balance the head-mounted display device.

As outlined above, such a head-mounted display device may be used as viewers by a surgeon during a surgical procedure. Accordingly, the processing circuitry of the video processing assembly may be configured to obtain the input display signal from a scientific or surgical imaging device of a scientific or surgical imaging system. Another aspect of the present disclosure relates to a scientific or surgical imaging system, comprising a scientific or surgical imaging device and the head-mounted display device. For example, the scientific or surgical imaging device may be configured to provide the input display signal to the head-mounted display device. This way, a head-mounted display device is provided that may avoid discomforts, such as headache or neck pain, when it is worn by a surgeon during surgery.

Some aspects of the present disclosure relate to a method for providing a head-mounted display device. The method comprises arranging a display assembly comprising one or more displays for displaying the image at a main mounting structure of the head-mounted display device, the main mounting structure being suitable for fastening the display assembly and the video processing assembly to the head of a user. The method comprises arranging a video processing assembly comprising processing circuitry for generating at least one processed display signal for the one or more displays based on an input display signal at the main mounting structure. At least one of a weight of the display assembly and the video processing assembly and a positioning of the display assembly and the video processing assembly at the main mounting structure is such, that a weight distribution between front and back of the head-mounted display device is balanced.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
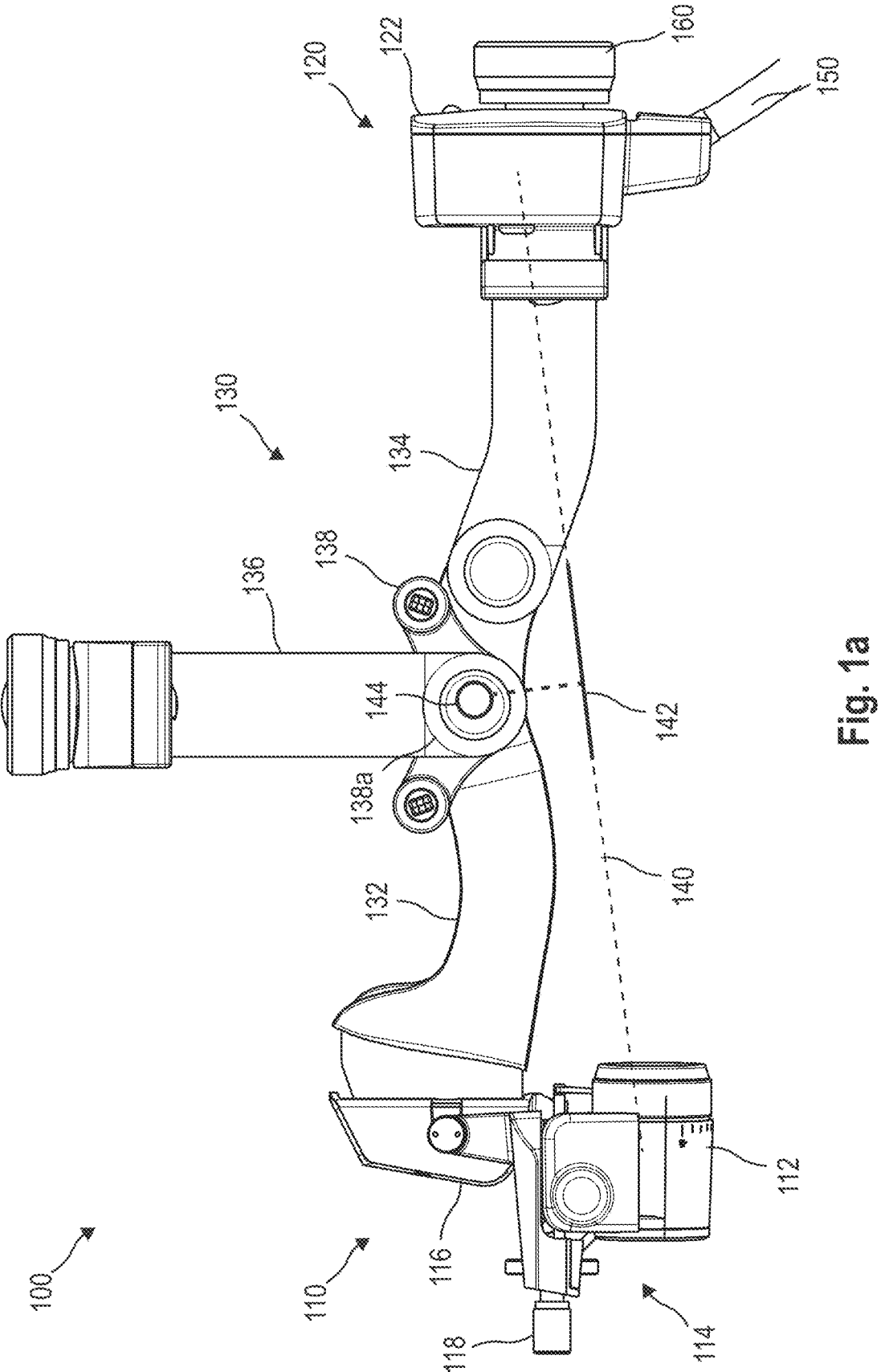
FIG. 1a shows a schematic diagram of a side view of an example of a head-mounted display device.

FIG. 1a shows a schematic diagram of a side view of an example of a head-mounted display device 100 for displaying an image. The head-mounted display device 100 shown in FIG. 1a comprises, at the front, a display assembly 110, comprising one or more displays 112 for displaying the image. The head-mounted display device 100 shown in FIG. 1a further comprises, at the back, a video processing assembly 120, comprising processing circuitry for generating at least one processed display signal for the one or more displays based on an input display signal. The display assembly 110 and the video processing assembly are mountable to a head of the user via a main mounting structure 130. The main mounting structure 130 is for fastening the display assembly and the video processing assembly to the head of the user. The split of the functionality of the head-mountable display device enables an improved distribution of the weight of the head-mounted display device, and thus an improved placement of the center of gravity. In particular, at least one of a weight of the display assembly and the video processing assembly and a positioning of the display assembly and the video processing assembly at the main mounting structure is such, that a weight distribution between front and back of the head-mounted display device is balanced. In the present context, the front and back directions are aligned with the viewing direction of the user wearing the head-mounted display device, with the front being at the display assembly (i.e., the direction where the user is looking) and the back being at the video processing assembly (i.e., at the back of the head).

Figure 1B:
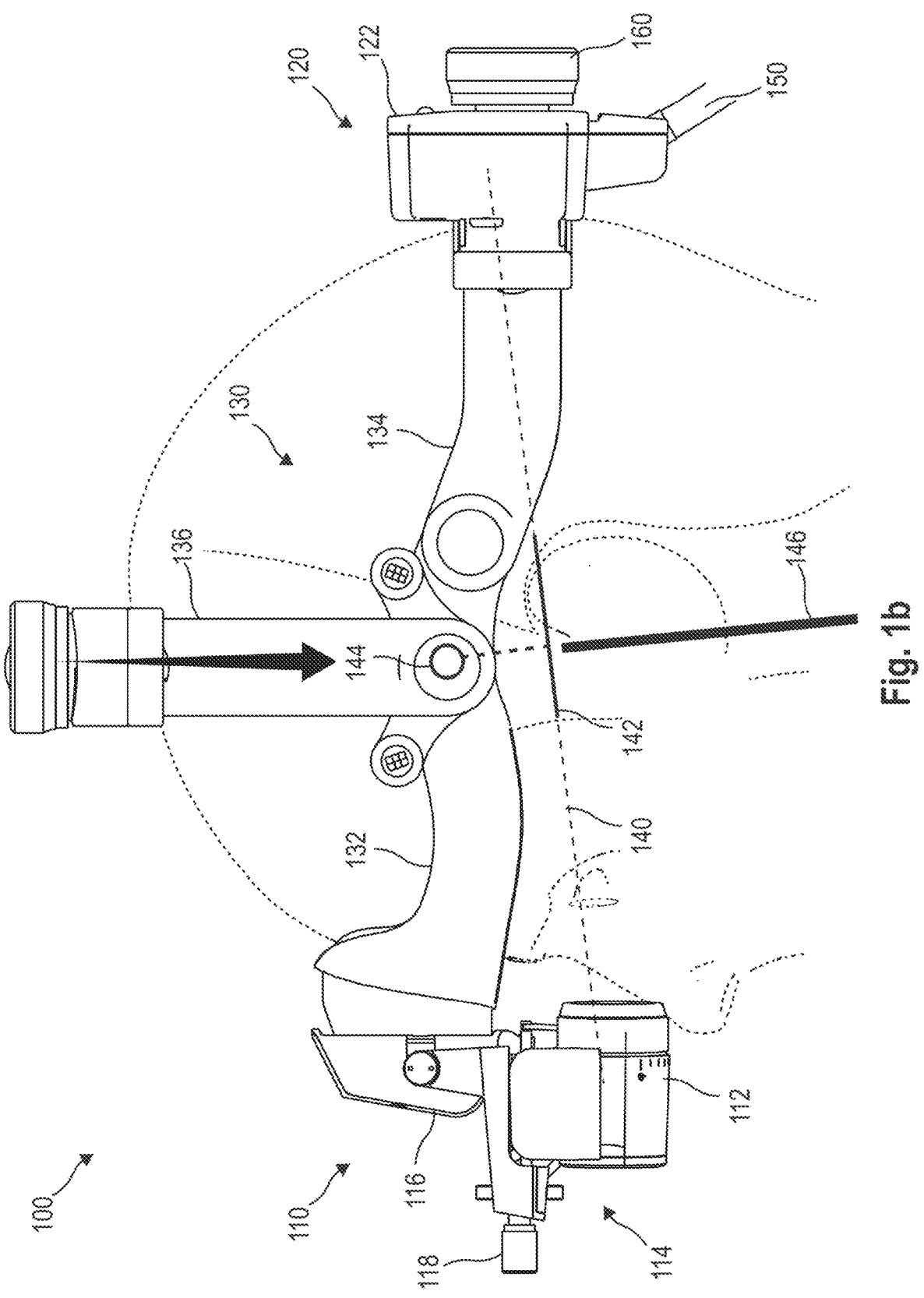
FIG. 1b shows another schematic diagram of a side view of an example of a head-mounted display device, illustrating placement of the head-mounted display device on the head of a user.
Figure 1C:
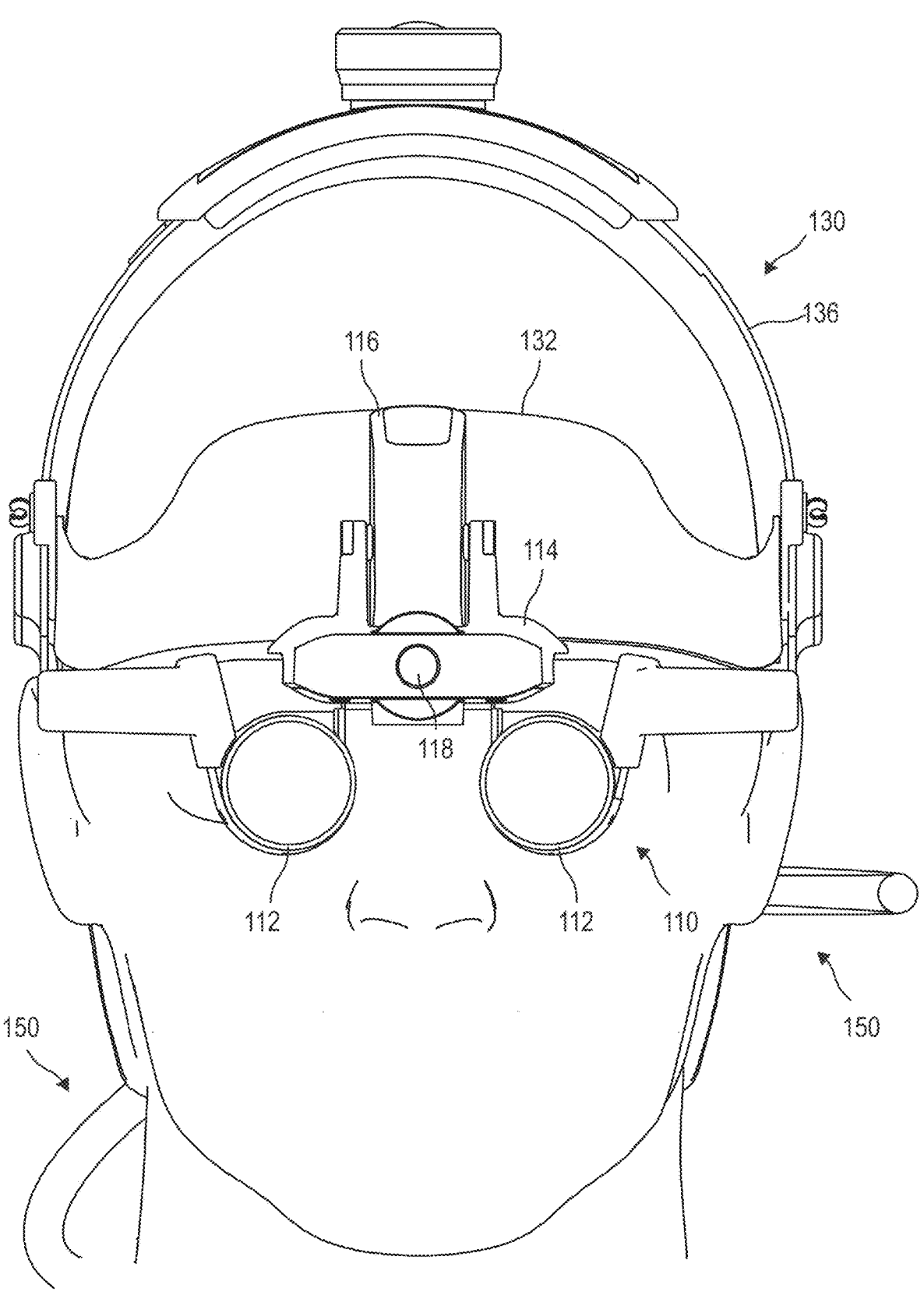
FIG. 1c shows a schematic diagram of a front view of an example of a head-mounted display device.

A head-mounted display (HMD) device is a wearable device that is designed to be worn on the head like a helmet or a pair of goggles. It comprises one or more displays that are mounted in front of the user's eyes, along with other electronic component. head-mounted display devices can be used for a variety of applications, such as virtual reality gaming, medical training, surgery, and more. The head-mounted display device 100 shown in FIG. 1*a* is designed with a focus on balancing the weight between the front and back of the head-mounted display device. For this purpose, the electronics of the head-mounted display device, i.e., the video processing assembly, are arranged at the back of the head-mounted display device, and therefore the backside of the head, e.g., to gain a substantially equal weight distribution between front side and back side. FIG. 1*b* shows another schematic diagram of a side view of an example of the head-mounted display device 100, illustrating placement of the head-mounted display device on the head of a user. As illustrated in FIG. 1*b*, a center of gravity 144 (further illustrated by the downward-facing arrow above the center of gravity) of the head-mounted display device may be placed on top of the spine 146. This can result in a comfortable feeling when wearing the headset, such that headaches, neck pain or other discomfort may be avoided when wearing the head-mounted display device. To further illustrate the design of the head-mounted display device 100 discussed in connection with FIGS. 1*a* to 1*e*, a front view of the head-mounted display device 100 is shown in FIG. 1*c*. FIG. 1*c* shows a schematic diagram of a front view of an example of the head-mounted display device 100.

The head-mounted display device 100 shown in connection with FIGS. 1*a* to 1*e* comprises three main components—the display assembly 110, the video processing assembly 120, and the main mounting structure 130.

The display assembly 110 is the component of the head-mounted display that displays the image for the user. It includes the one or more displays 112 for displaying the image. In some examples, as shown in FIGS. 1*a* to 1*d*, two separate displays 112 may be used, one for each eye. Alternatively, a single display 112 may be used, e.g., a single display being used for both eyes, or a single display being used for only one of the eyes, with the image not being provided to the other eye. For example, display(s) 112 may be an LCD display (Liquid Crystal Display), a TFT display (thin-film transistor-display) or an OLED display (organic light-emitting diode display). A display diagonal of each of the display(s) 112 may be at least 0.5 inch (or at least 0.6 inch) and/or at most 1 inch (or at most 0.8 inch), in particular if two separate displays are used. The display(s) 112 may (each) be combined with an optical arrangement comprising one or more optical elements, such as one or more lenses, to improve a view of the user on the display(s) 112, and/or to perform dioptric compensation (separately) for the eyes of the user.

The display assembly 110 shown in FIGS. 1*a* to 1*d* further comprises an optional tilting mechanism 114, which can be used to tilt the display(s) 112 (with the optical arrangement) upwards, such that the display(s) 112 are no longer in the field of view of the user. The tilting mechanism 114 is attached to the connector 116 and to the display(s) 112. It can be manually moved between the position in front of the eyes of the user and the upward position using handles (which are visible in FIG. 1*b*) at either side of the tilting mechanism 114.

Additionally, the display assembly 110 further includes an optional rotary knob 118 for adjusting an interpupillary distance of the displays 112. The rotary knob 118 is attached to an adjustment mechanism that is configured to adjust (i.e., vary) the distance between the two displays 112 of the display assembly 110, and thus the interpupillary distance. The rotary knob 118 is arranged at the center of the display assembly 110.

While the display assembly 110 is arranged at the front side of the head-mounted display device 100, the video processing assembly 120 is arranged at the other side, i.e., the back side, of the head-mounted display device, to act as a counterweight for the display assembly 110. More details on the video processing assembly are discussed in connection with FIG. 1*e*.

To provide an improved front-to-back balance of the head-mounted display device, the display assembly 110 and the video processing assembly 120 are arranged at opposite sides of the main mounting structure 130, with the placement and weight of the respective assemblies being chosen such, that a balance of the head-mounted display device is ensured. In other words, the electronics, e.g., including a heatsink, for the display(s) 112 are placed on the backside of the head-mounted display device, so that the weight is substantially equally distributed to front and back side. In more general terms, at least one of a weight of the display assembly and the video processing assembly and a positioning of the display assembly and the video processing assembly at the main mounting structure is such, that a weight distribution between front and back of the head-mounted display device is balanced. In this context, balanced is not an absolute term—it is merely used to distinguish the head-mounted display devices having a weight distribution, where more than two thirds of the weight is placed at either the front or the back of the head-mounted display device. In other words, the head-mounted display device may be considered balanced, if less than two thirds (or at most 60%, or at most 55%) of the weight of the head-mounted display device is placed at either portion (e.g., at the front portion and at the back portion) of the head-mounted display device. This can be done by balancing the weight and placement of the individual component such, that the center of gravity is laterally located towards the center of the head-mounted display device.

In FIGS. 1*a* and 1*b*, various visual affordances are included for explaining the effect. FIGS. 1*a* and 1*b* show an imaginary line 140 between the display assembly 110 (e.g., the displays of the display assembly) and the video processing assembly 120. For example, the imaginary line may extend from a center of gravity of the display assembly to a center of gravity of the video processing assembly (e.g., when the display assembly 110 is in front of the eyes and not tilted upwards). Alternatively (albeit the result may be similar), the imaginary line may extend, if a single display 112 is used, from a center point of the display or, if two displays are used, from a center point between the two displays 112, to a center point of the processing circuitry of the video processing assembly 120 (e.g., when the display assembly 110 is in front of the eyes and not tilted upwards).

This imaginary line 140 includes a center section 142, which may, for example, occupy (i.e., stretch along) 20% (or 30%, or 40%) of the length of the imaginary line 140 at the center (i.e., centered around the center) of the imaginary line 140. FIGS. 1a and 1b further shows the center of gravity 144, which is, in the example shown in FIGS. 1a and 1b, shown near the position of the joint 138a. However, as the head-mounted display device 100 is a three-dimensional object, the center of gravity is at the center between the two joints 138a that are located at either side of the head-mounted display device. The center of gravity of the head-mounted device may be at, or laterally offset from (e.g., at an orthogonal angle), this center section of the imaginary line. In other words, at least one of the weight of the display assembly and the video processing assembly and the positioning of the display assembly and the video processing assembly at the main mounting structure may be (chosen, selected) such, that the center of gravity 144 of the head-mounted display device may be at, or orthogonally offset from, the center section 142 of an imaginary line 140 between the display assembly and video processing assembly.

It is to be noted that this particular center of gravity is merely an example—the proposed concept is applicable to a wide range of potential placements for the center of gravity. While a perfect 50%/50% weight distribution towards the front and the back may be desirable in some cases, in reality, a 60%/40% or 40%/60% weight distribution may also be comfortable. For example, at least one of the weight of the display assembly and the video processing assembly and the positioning of the display assembly and the video processing assembly at the main mounting structure may be selected such, that a weight distribution between front and back of the head-mounted display device is substantially equal. For example, between 40% and 60% (or between 45% to 55%, or between 47% and 53%) of the weight of the head-mounted display device may be placed towards the front of the device (relative to a geometrical center of the head-mounted display device), and the remaining weight of the of the head-mounted display device may be placed towards the back of the device (relative to the geometrical center of the head-mounted display device). In some examples, it may even be desirable to have slightly more weight at the back, as surgeons often operate with their heads slightly tilted downward, which would be made uncomfortable by additional weight in the front. For example, the weight of the video processing assembly 120 may be larger than the weight of the display assembly 110. For example, the weight of the video processing assembly may be at most 50% larger (or at most 40% larger, or at most 25% larger, or at most 10% larger) than the weight of the display assembly.

The main mounting structure 130 is used to fasten, secure, affix and/or mount the display assembly 110 and the video processing assembly 120 to the head of a user. The main mounting structure 130 may comprise various structural features to enable a secure and stable mounting of the head-mounted display device 100 on the head of a user. For example, the main mounting structure 130 may comprise one or more headbands 132, 134, 136, a head strap, an adjustable frame and/or a head suspension arrangement configured to distribute a weight of the head-mounted display device 100 over the head of the user. In the example shown in FIGS. 1a to 1d, the main mounting structure 130 is shown with two headbands, a first headband 136 for crossing the head of the user (i.e., pass over top of user's head), and a second headband 132, 134 for extending around the head of the user. For example, the center of gravity 144 may be orthogonally offset from the center section 142 of the imaginary line 140 towards the (center of the) first headband 136.

In the example of FIGS. 1a to 1d, the first headband 136 is arranged to cross the head of the user of the head-mounted display device in parallel to the display assembly. Alternatively, the first headband 136 may be arranged from front to back. In the example shown in FIGS. 1a to 1c, the second headband 132, 134 comprises a front portion 132 and a back portion 134, which are connected together by a connector 138 on either side of the head of the user. In addition, the first headband 136 is connected to the connector. In the example shown in FIGS. 1a to 1d, the first headband 136 is attached to the connector 138 in a fixed manner, while the front and back portions 132, 134 of the second headband are movably connected to the connector 138. For this purpose, the connector 138 shown in FIGS. 1a to 1d comprises a joint or articulation element 138a, to which the front and back portions 132, 134 of the second headband are movably connected. The front portion 132 of the second headband is further connected to the display assembly 110, e.g., via a connector 116 of the display assembly 110. The back portion 134 of the second headband is further connected to the video processing assembly 120. This configuration of the headbands is merely an example, and other configurations are possible as well, e.g., with the first headband being attached directly to the display assembly 110 and the video processing assembly 120, and with the second headband not separated into front and back portions.

The main mounting structure 130 may be configured to carry a weight (e.g., the complete weight) of the display assembly 110 and of the video processing assembly 120. For example, less than 40% (or less than 50%, less than 30% or less than 20%) of the weight of the head-mounted display device or no weight of the head-mounted display device might rest on the nose of the user (e.g., through a nose piece).

Figure 1D:
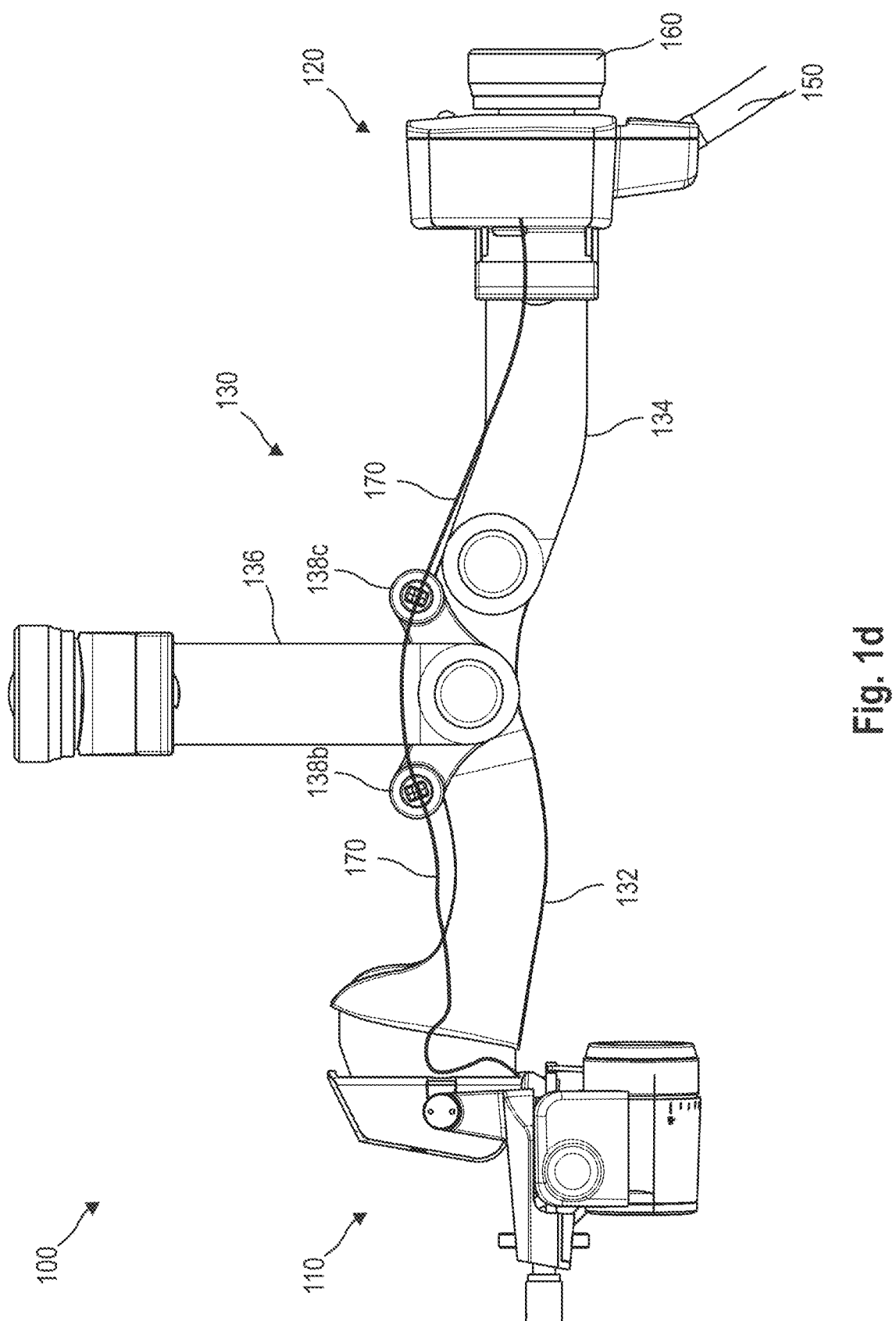
FIG. 1d shows another schematic diagram of a side view of an example of a head-mounted display device, illustrating a cable being routed between a video processing assembly and a display assembly.

To enable the separation of the display assembly 110 and the video processing assembly 120 at the front and back of the head-mounted display device 100, a cable may be used to transfer data, and in particular the processed display device, from the processing circuitry of the video processing assembly 120 to the display(s) 112 of the display assembly 110. In other words, the data may be transferred with cables to the front part. FIG. 1d shows another schematic diagram of a side view of an example of a head-mounted display device, illustrating a cable 170 (or rather cables) being routed (at either side) between the video processing assembly 120 and the display assembly 110. The video processing assembly 120 (and the respective display 112) may (each) include an interface for the cable 170. In addition, the video processing assembly 120 may include an interface (which may be the same or a different interface) for an input cable 150, which is used to supply the input display signal to the video processing assembly 120. In summary, the video processing assembly may comprise at least one interface for providing the at least one processed display signal to the one or more displays of the display assembly via at least one cable (e.g., two cables, one for each display 112) being mounted to the main mounting structure (via cable clips 138*b*, 138*c* shown in FIG. 1*d*) and for receiving the input display signal via the input cable 150.

The processing circuitry of the video processing assembly is used to perform the video processing tasks inside the head-mounted display device. In particular, the processing circuitry is configured to generate the at least one processed display signal (e.g., two processed display signals) for the one or more displays 112 based on the input display signal. To generate the at least one processed display signal, various video processing tasks may be performed by the by the processing circuitry. For example, if two separate displays 112 are being used, the video processing circuitry may be configured to split the input display signal into two processed display signals for the two displays 112 of the display assembly, e.g., to provide a portion of the input display signal to the respective display 112. For example, the input display signal may include a stereoscopic video signal (e.g., with a left channel and a right channel), e.g., a stereoscopic video signal of a stereoscopic scientific or surgical imaging device. The processing circuitry may be configured to split the stereoscopic video signal into the two channels and provide one of the channels to each of the two displays 112. In addition, the processing circuitry may be used to tailor the image shown by the respective display 112 to the specific head-mounted display device, e.g., according to user preference. For example, the video processing circuitry may be configured to adjust at least one of a brightness, a x/y shift (e.g., a spatial relationship between the two channels provided to the two displays 112 for horizontal and vertical alignment of the two displays 112, which may be different for different interpupillary distances) and a white balance in the at least one processed display signal. For example, properties such as the brightness, x/y shift and white balance may be inherent to the specific head-mounted display device (e.g., depending on the physical properties of the display(s) and/or the range of supported interpupillary distances), and be defined by a head-mounted display device-specific calibration parameter. For example, the x/y shift may relate to the horizontal and vertical alignment of the image shown on the two displays 112, with the processed display signal being electronically shifted so that the left channel and the right channel match each other. Accordingly, the video processing circuitry may be configured to generate the at least one processed display according to at least one calibration parameter.

Figure 1E:
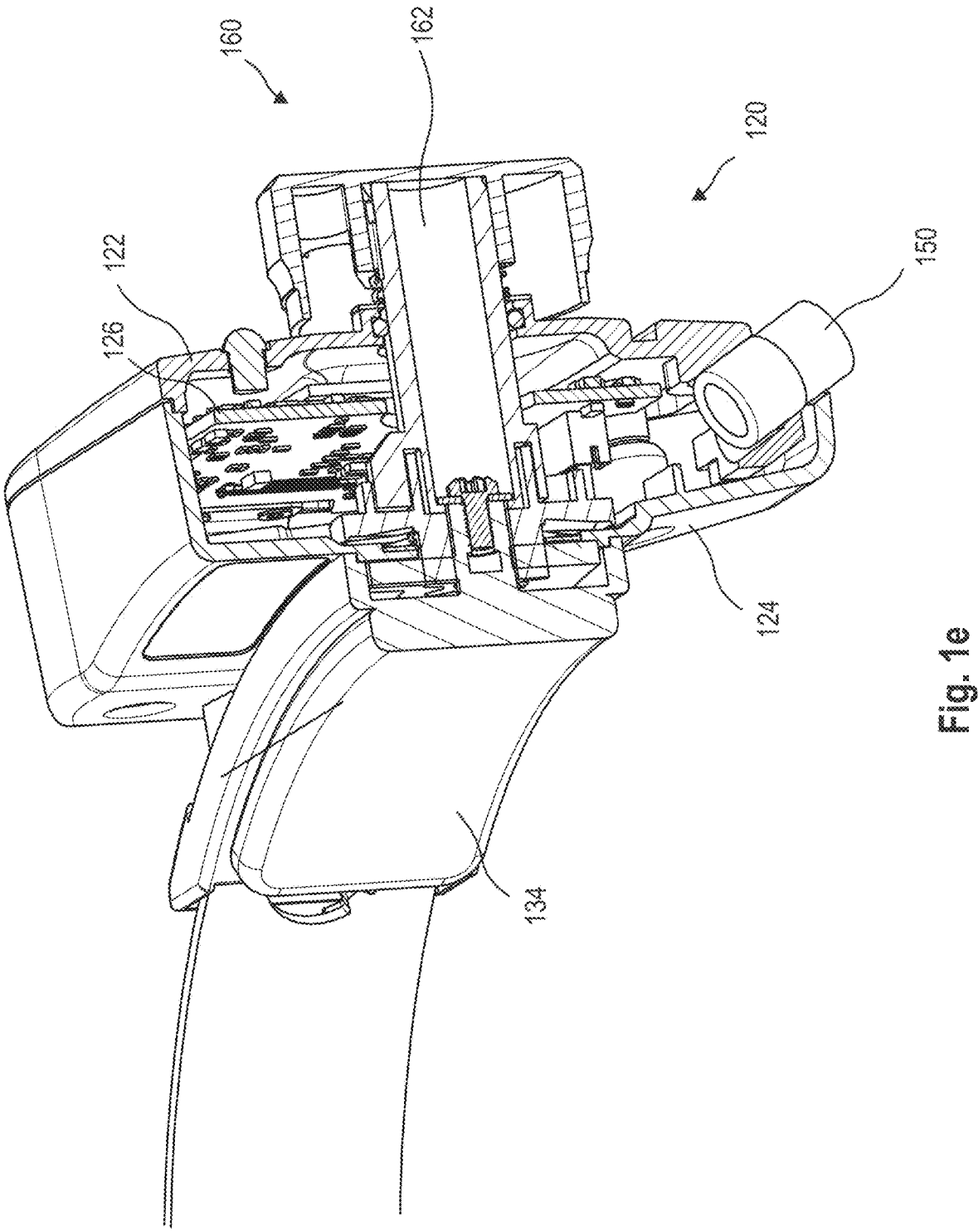
FIG. 1e shows a schematic diagram of a cutaway view of a video processing assembly and of a size adjustment mechanism of an example of a head-mounted display device.

With respect to the construction of the video processing assembly 120, an example is shown in FIG. 1*e*. FIG. 1*e* shows a schematic diagram of a cutaway view of an example of the video processing assembly 120. The video processing assembly 120 may comprise a housing 122, 124 and a printed circuit board 126, which hosts the processing circuitry (not shown). In the example shown in FIG. 1*e*, the housing comprises a first component (with one or more walls) 124 that faces towards the rest of the head-mounted display device (e.g., towards the main mounting structure 130 (shown on the left in FIG. 1*e*), and a second component (with one or more further walls 122) that faces away from the rest of the head-mounted display device. For example, the second component may be considered the back cover of the housing of the video processing assembly 120.

The head-mounted display device 100 shown in FIGS. 1*a* to 1*e* further comprises an optional size adjustment mechanism 160 for adjusting a circumference (e.g., a length of the (back portion 134) of the second headband) of the main mounting structure 130. The size adjustment mechanism 160 comprises a rotary knob, a shaft 162, and a gear wheel, which interfaces with the back portion(s) of the headband to adjust the circumference of the main mounting structure 130. For example, the size adjustment mechanism 160 may be a ratcheting mechanism. To improve the placement of the rotary knob, the housing and the printed circuit board comprise holes for passing through the shaft 162 of the size adjustment mechanism 160. In other words, in the video processing assembly 120, the printed circuit board 126 may provide a hole that the shaft of the ratcheting mechanism can be guided through the electronics. This can reduce footprint of the video processing assembly 120.

The back cover 122 of the video processing assembly 120 may serve a dual purpose—it may be used to tare the weight distribution of the head-mounted display device (by being made of metal, such as Aluminum), and, being metal, it may also be used as a heatsink for the processing circuitry. For example, at least one wall 122 of the housing, e.g., the back cover 122, may comprise a metal and act as a heatsink for the processing circuitry. For example, an Aluminum plate may be used as back cover, and therefore also as heat sink for the electronics (e.g., the processing circuitry and the interface(s) of the back). To avoid the heat reducing the comfort of the wearer, the wall being used as heatsink may face away from the user. In other words, the at least one wall acting as a heatsink (e.g., the back cover) may be arranged such that it faces away from the head-mounted display device. The metal (e.g., Aluminum) plate may also help to keep the head-mounted display device weight balanced (front and back). For example, the at least one wall comprising metal may act as a counterweight for the display assembly. In addition, the back cover 122 may be used as mounting plate for cables, lightguide O-rings etc.

The interfaces of the video processing assembly, which may be arranged on the printed circuit board and connected to the processing circuitry, may correspond to one or more inputs and/or outputs for receiving and/or transmitting information, which may be in digital (bit) values according to a specified code, within a module, between modules or between modules of different entities. For example, the interfaces arranged on the printed circuit board may comprise interface circuitry configured to receive and/or transmit information.

The processing circuitry of the video processing assembly may be implemented using one or more processing units, one or more processing devices, any means for processing, such as a processor, a computer or a programmable hardware component being operable with accordingly adapted software. In other words, the described function of the processing circuitry of the video processing assembly may as well be implemented in software, which is then executed on one or more programmable hardware components. Such hardware components may comprise a general-purpose processor, a Digital Signal Processor (DSP), a micro-controller, etc.

More details and aspects of the head-mounted display device are mentioned in connection with the proposed concept, or one or more examples described above or below (e.g., FIG. 2 to 3). The head-mounted display device may comprise one or more additional optional features corresponding to one or more aspects of the proposed concept, or one or more examples described above or below.

Figure 2:
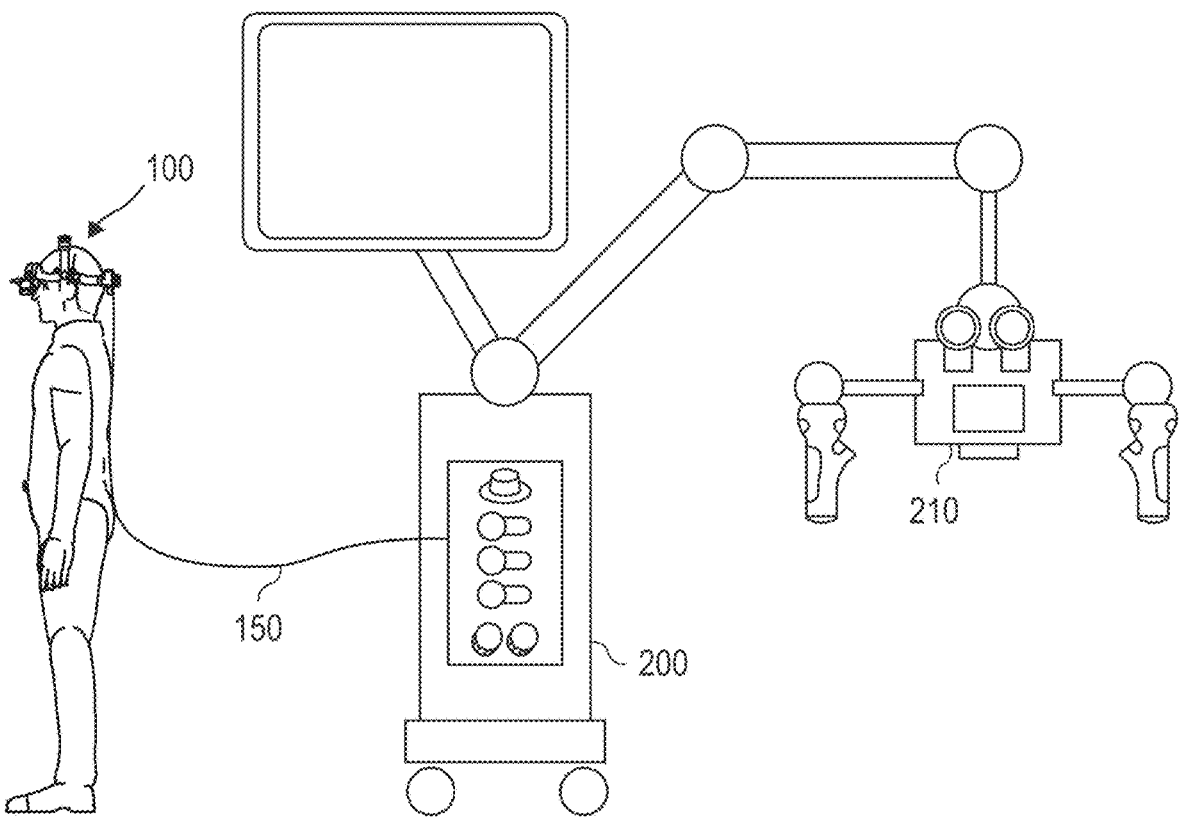
FIG. 2 shows a schematic diagram of an example of a scientific or surgical imaging device.

The head-mounted display device introduced in connection with FIGS. 1*a* to 1*e* may, for example, be used to view images generated by a scientific or surgical imaging device of a scientific or surgical imaging system, such as a scientific or surgical imaging device 210 of scientific or surgical imaging system 200 of FIG. 2. FIG. 2 shows a schematic diagram of an example of a scientific or surgical imaging system. The scientific or surgical imaging system 200 comprises the scientific or surgical imaging device 210 and, optionally, the head-mounted display device 100. Alternatively, the head-mounted display device 100 may be connected to the scientific or surgical imaging system 200. For example, the processing circuitry of the video processing assembly may be configured to obtain the input display signal from the scientific or surgical imaging device 210 of the scientific or surgical imaging system 200. Accordingly, the scientific or surgical imaging device 210 may be configured to provide the input display signal to the head-mounted display device 100. For example, the input display signal may comprise a (stereoscopic) video stream that is based on imaging sensor data of the scientific or surgical imaging device.

An example of such a scientific or surgical imaging device, as shown in FIG. 2, is a surgical microscope, which is a type of surgical imaging device. A microscope is an optical instrument that is used to view and magnify small objects, typically too small to be seen with the naked eye. It works by using a combination of lenses and light to produce a magnified image of the object being viewed. A surgical microscope is a microscope for use during surgical procedures. Alternatively, the surgical imaging device may be a surgical exoscope or a surgical endoscope. Exoscopes are camera-based imaging systems, and in particular camera-based 3D imaging systems, which are suitable for providing images of surgical sites with high magnification and a large depth of field. Compared to purely optical or hybrid microscopes, which may be used via oculars, exoscopes are only used via display modalities, such as monitor or a head-mounted display. An endoscope is a medical instrument that is a flexible tube with a light and camera attached to it. Endoscopes are used to examine the inside of the body, e.g., during a surgical procedure.

Alternatively, the scientific or surgical microscope system may be scientific microscope system, such as a system comprising a laboratory microscope for use in a scientific setting.

More details and aspects of the scientific or surgical imaging system and/or of the head-mounted display device are mentioned in connection with the proposed concept or one or more examples described above or below (e.g., FIG. 1a to 1e, 3). The scientific or surgical imaging system and/or of the head-mounted display device may comprise one or more additional optional features corresponding to one or more aspects of the proposed concept, or one or more examples described above or below.

Figure 3:
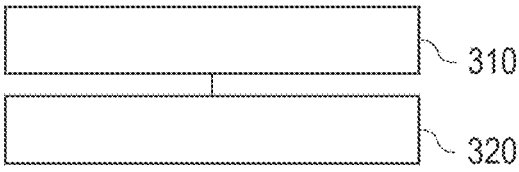
FIG. 3 shows a flow chart of an example of a method for providing a head-mounted display device.

FIG. 3 shows a flow chart of an example of a method for providing a head-mounted display device, such as the head-mounted display device 100 introduced in connection with FIGS. 1a to 1e. The method comprises arranging 310 a display assembly comprising one or more displays for displaying the image at a main mounting structure of the head-mounted display device. The main mounting structure is suitable for fastening the display assembly and the video processing assembly to the head of a user. The method comprises arranging 320 a video processing assembly comprising processing circuitry for generating at least one processed display signal for the one or more displays based on an input display signal at the main mounting structure. At least one of a weight of the display assembly and the video processing assembly and a positioning of the display assembly and the video processing assembly at the main mounting structure is such, that a weight distribution between front and back of the head-mounted display device is balanced.

For example, the method may be performed to obtain the head-mounted display device introduced in connection with one of the FIGS. 1a to 1e. Features introduced in connection with the head-mounted display device 100 of FIGS. 1a to 1e may likewise be included in the corresponding method.

More details and aspects of the method are mentioned in connection with the proposed concept, or one or more examples described above or below (e.g., FIG. 1a to 2). The method may comprise one or more additional optional features corresponding to one or more aspects of the proposed concept, or one or more examples described above or below.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Head-mounted display device
110 Display assembly
112 Display(s)
114 Tilting mechanism
116 Connector
118 Rotary knob
120 Video processing assembly
122 Second component of housing, back cover, wall
124 First component of housing, wall
126 Printed circuit board
130 Main mounting structure
132 Front portion of a second headband
134 Back portion of a second headband
136 First headband
138 Connector
138a Joint, articulation element
138b, 138c Cable clip
140 Imaginary line
142 Center section of the imaginary line
144 Center of gravity
146 Spine of the user
150 Input cable
160 Size adjustment mechanism
162 Shaft of a size adjustment mechanism
170 Cable
200 Scientific or surgical imaging system
210 Scientific or surgical imaging device, surgical microscope
310 Arranging a display assembly
320 Arranging a video processing assembly

The invention claimed is:
1. A head-mounted display device for displaying an image, the head-mounted display device comprising:
   a display assembly, comprising one or more displays for displaying the image;
   a video processing assembly, comprising processing circuitry for generating at least one processed display signal for the one or more displays based on an input display signal; and
   a main mounting structure for fastening the display assembly and the video processing assembly to the head of a user, wherein at least one of a weight of the display assembly and the video processing assembly and a positioning of the display assembly and the video processing assembly at the main mounting structure is such that a weight distribution between front and back of the head-mounted display device is balanced, wherein the video processing assembly comprises a housing and a printed circuit board with the processing circuitry, wherein at least one wall of the housing comprises a metal acting as a heatsink for the processing circuitry, wherein the metal acts as a counterweight for the display assembly.

2. The head-mounted display device according to claim 1, wherein at least one of the weight of the display assembly and the video processing assembly and the positioning of the display assembly and the video processing assembly at the main mounting structure is such that a center of gravity of the head-mounted display device is at, or orthogonally offset from, a center section of an imaginary line between the display assembly and video processing assembly.

3. The head-mounted display device according to claim 1, wherein at least one of the weight of the display assembly and the video processing assembly and the positioning of the display assembly and the video processing assembly at the main mounting structure is selected such that a weight distribution between front and back of the head-mounted display device is substantially equal.

4. The head-mounted display device according to claim 1, wherein a weight of the video processing assembly is at most 50% larger than a weight of the display assembly.

5. The head-mounted display device according to claim 1, wherein the main mounting structure comprises a first headband and a second headband, the first headband being arranged to cross the head of the user of the head-mounted display device and the second headband being arranged to extend around the head of the user.

6. The head-mounted display device according to claim 5, wherein a center of gravity is orthogonally offset from a center section of the imaginary line towards the first headband.

7. The head-mounted display device according to claim 1, wherein the video processing assembly comprises at least one interface for providing the at least one processed display signal to the one or more displays of the display assembly via at least one cable being mounted to the main mounting structure and for receiving the input display signal via an input cable.

8. The head-mounted display device according to claim 1, wherein the video processing circuitry is configured to split the input display signal into two processed display signals for two displays of the display assembly, and/or wherein the video processing circuitry is configured to adjust at least one of a brightness, a x/y shift and a white balance in the at least one processed display signal, and/or wherein the video processing circuitry is configured to generate the at least one processed display according to at least one calibration parameter.

9. The head-mounted display device according to claim 1, wherein the video processing assembly comprises a housing and a printed circuit board with the processing circuitry, wherein the housing and the printed circuit board comprise holes for passing through a shaft of a size adjustment mechanism for adjusting a circumference of the main mounting structure.

10. The head-mounted display device according to claim 1, wherein the at least one wall acting as a heatsink is arranged such that it faces away from the head-mounted display device.

11. The head-mounted display device according to claim 1, wherein the processing circuitry of the video processing assembly is configured to obtain the input display signal from a scientific or surgical imaging device of a scientific or surgical imaging system.

12. A scientific or surgical imaging system, comprising a scientific or surgical imaging device and the head-mounted display device according to claim 11, wherein the scientific or surgical imaging device is configured to provide the input display signal to the head-mounted display device.

13. A method for providing a head-mounted display device, the method comprising:

arranging a display assembly comprising one or more displays for displaying the image at a main mounting structure of the head-mounted display device, the main mounting structure being suitable for fastening the display assembly and the video processing assembly to the head of a user; and arranging a video processing assembly comprising processing circuitry for generating at least one processed display signal for the one or more displays based on an input display signal at the main mounting structure, wherein at least one of a weight of the display assembly and the video processing assembly and a positioning of the display assembly and the video processing assembly at the main mounting structure is such that a weight distribution between front and back of the head-mounted display device is balanced, wherein the video processing assembly comprises a housing and a printed circuit board with the processing circuitry, wherein at least one wall of the housing comprises a metal acting as a heatsink for the processing circuitry, wherein the metal acts as a counterweight for the display assembly.

* * * * *